US011867016B2

(12) United States Patent
AlSultan et al.

(10) Patent No.: US 11,867,016 B2
(45) Date of Patent: Jan. 9, 2024

(54) ROBOTIC FISHING TOOL

(71) Applicant: Saudi Arabian Oil Company, Dhahran (SA)

(72) Inventors: Fuad A. AlSultan, Alahsa (SA); Ahmed J. AlSultan, Alahsa (SA); Abdulrahman Mishkhes, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 112 days.

(21) Appl. No.: 17/551,943

(22) Filed: Dec. 15, 2021

(65) Prior Publication Data

US 2023/0184046 A1 Jun. 15, 2023

(51) Int. Cl.
| | |
|---|---|
| *E21B 31/18* | (2006.01) |
| *B25J 9/06* | (2006.01) |
| *E21B 47/002* | (2012.01) |
| *B25J 9/16* | (2006.01) |
| *B25J 15/00* | (2006.01) |
| *E21B 31/00* | (2006.01) |
| *E21B 31/12* | (2006.01) |

(52) U.S. Cl.
CPC .............. *E21B 31/18* (2013.01); *B25J 9/06* (2013.01); *B25J 9/1679* (2013.01); *B25J 9/1697* (2013.01); *B25J 15/0009* (2013.01); *E21B 31/00* (2013.01); *E21B 31/12* (2013.01); *E21B 47/002* (2020.05)

(58) Field of Classification Search
CPC ........ E21B 31/18; E21B 47/002; E21B 31/00; E21B 31/12; B25J 15/009
See application file for complete search history.

(56) References Cited

U.S. PATENT DOCUMENTS

| | | | |
|---|---|---|---|
| 1,766,368 A | 6/1930 | Wigle | |
| 6,041,860 A | 3/2000 | Nazzal et al. | |
| 6,095,583 A | 8/2000 | Beeman et al. | |
| 6,431,270 B1 | 8/2002 | Angle | |
| 8,397,815 B2 | 3/2013 | MacDougall et al. | |
| 9,581,011 B2 | 2/2017 | Tjhang | |
| 2018/0363830 A1* | 12/2018 | Baugh | E21B 31/14 |
| 2021/0023714 A1* | 1/2021 | Zhang | H04N 13/254 |

FOREIGN PATENT DOCUMENTS

| | | | | |
|---|---|---|---|---|
| EP | 0418057 | | 3/1991 | |
| WO | WO-2004028753 A2 * | | 4/2004 | B25J 15/0009 |

* cited by examiner

*Primary Examiner* — Tara Schimpf
*Assistant Examiner* — Jennifer A Railey
(74) *Attorney, Agent, or Firm* — Fish & Richardson P.C.

(57) ABSTRACT

A downhole robotic fishing tool includes a main body configured to be positioned in a wellbore and an intermediate body connected to a downhole end of the main body by an upper articulating joint. A robotic hand is connected to a downhole end of the intermediate body by a lower articulating joint. The robotic hand is configurable between an open configuration and a closed configuration and includes a palm, a robotic thumb and a robotic finger attached at their respective proximal ends to the palm in opposition. When in the closed configuration, the distal ends of the thumb and finger are within a grasp center area centered on a center point defined by an intersection of a grasping axis and an opposition axis of the robotic hand. A camera is positioned on the palm that has an optical axis that intersects the grasp center area proximate the center point.

21 Claims, 10 Drawing Sheets

FIG. 4

ROBOTIC FISHING TOOL

TECHNICAL FIELD

The present disclosure relates to subterranean wells, and more specifically, to removing objects from a subterranean well.

BACKGROUND

In subsurface well drilling and completion operations, it is not uncommon for an object (such as a tool, pipe, or fragment or component thereof) to fall into, get stuck, or unintentionally be left within a wellbore of a subterranean well. This fallen, stuck, or left object is known as a fish. A fish may have one of a variety of unspecified sizes or shapes and can be, for example, as small around as a wire or have a diameter as large as a drill pipe, and can also vary in terms of its location, position, and orientation within the wellbore. The retrieval of such objects from a wellbore is referred to as fishing.

SUMMARY

Certain aspects of the subject matter herein can be implemented as a downhole robotic fishing tool. The tool includes a main body configured to be positioned in a wellbore and an intermediate body connected to a downhole end of the main body by an upper articulating joint. The tool further includes a robotic hand connected to a downhole end of the intermediate body by a lower articulating joint. The robotic hand is configurable between an open configuration and a closed configuration and includes a palm, a robotic thumb and a robotic finger attached at their respective proximal ends to the palm in opposition such that, when the robotic hand is in the closed configuration, a distal end of the robotic thumb and a distal end of robotic finger are within a grasp center area centered on a center point defined by an intersection of a grasping axis and an opposition axis of the robotic hand. The tool further includes a camera positioned on the palm that has an optical axis that intersects the grasp center area proximate the center point.

An aspect combinable with any of the other aspects can include the following features. The robotic hand can be configurable between a plurality of intermediate configurations between the open configuration and the closed configuration.

An aspect combinable with any of the other aspects can include the following features. The downhole robotic fishing tool of claim 1, wherein the robotic finger is a first robotic finger of a plurality of robotic fingers attached at their respective proximal ends to the palm and individually rotatable in opposition to the robotic thumb substantially in parallel with the first robotic finger.

An aspect combinable with any of the other aspects can include the following features. The robotic thumb and the robotic finger can each include a plurality of joint segments.

An aspect combinable with any of the other aspects can include the following features. At least some of the plurality of joint segments can each include a respective proximal phalange, a respective intermediate phalange, and a respective distal phalange.

An aspect combinable with any of the other aspects can include the following features. The tool can also include a fluid nozzle positioned on the palm and configured to flow a substantially optically clear fluid to the grasp center area.

An aspect combinable with any of the other aspects can include the following features. The main body can be configured to attach to a downhole end of a coiled tubing string.

An aspect combinable with any of the other aspects can include the following features. The main body can be configured to attach to a wireline conveyance.

An aspect combinable with any of the other aspects can include the following features. The tool can also include sensors configured to measure tension or compression forces acting on at least a portion of the tool.

An aspect combinable with any of the other aspects can include the following features. The tool can also include a light source positioned on the palm and configured to illuminate the grasp center area.

An aspect combinable with any of the other aspects can include the following features. The optical axis of the camera can be substantially perpendicular to the grasping axis of the hand.

An aspect combinable with any of the other aspects can include the following features. The camera can include a plurality of lenses configured to provide an operator with binocular images.

Certain aspects of the subject matter herein can be implemented as a method of fishing an object from within a wellbore. The method includes disposing a robotic fishing tool in the wellbore. The robotic fishing tool include a main body, an intermediate body connected to a downhole end of the main body by an upper articulating joint, and a robotic hand connected to a downhole end of the intermediate body by a lower articulating joint. The robotic hand is configurable between an open configuration and a closed configuration and includes a palm, a robotic thumb and a robotic finger attached at their respective proximal ends to the palm in opposition such that, when the robotic hand is in the closed configuration, a distal end of the robotic thumb and a distal end of robotic finger are within a grasp center area centered on a center point defined by an intersection of a grasping axis and an opposition axis of the robotic hand. The tool also includes a camera positioned on the palm that has an optical axis that intersects the grasp center area proximate the center point. The method also includes determining, based on an image from the camera, a characteristic of the object, the characteristic of the object comprising at least one of its type, location, position, orientation, or size. Based on the determined the characteristic of the object, the robotic hand is positioned in the wellbore such that the object is in or near the grasp center area, and the robotic thumb and robotic finger are configured to grasp the object.

An aspect combinable with any of the other aspects can include the following features. After configuring the robotic thumb and robotic finger to grasp the object, the tool can be pulled in an uphole direction. Based on a measurement by a tension or compression sensor on the tool, it can be confirmed that the object has been grasped and is being pulled in an uphole direction by the tool.

An aspect combinable with any of the other aspects can include the following features. A substantially optically clear fluid can be flowed, by a fluid nozzle positioned on the palm, to the grasp center area.

An aspect combinable with any of the other aspects can include the following features. The grasp central area can be illuminated by a light source positioned on the palm.

An aspect combinable with any of the other aspects can include the following features. The camera can include a plurality of lenses configured to provide an operator with binocular images.

Certain aspects of the subject matter herein can be implemented as a system for fishing an object from a wellbore. The system includes a fishing tool configured to be positioned in the wellbore. The tool includes a main body, an intermediate body connected to a downhole end of the main body by an upper articulating joint, and a robotic hand connected to a downhole end of the intermediate body by a lower articulating joint. The robotic hand is configurable between an open configuration and a closed configuration and includes a palm, a robotic thumb and a robotic finger attached at their respective proximal ends to the palm in opposition such that, when the robotic hand is in the closed configuration, a distal end of the robotic thumb and a distal end of robotic finger are within a grasp center area centered on a center point defined by an intersection of a grasping axis and an opposition axis of the robotic hand. The tool also includes a camera positioned on the palm that has an optical axis that intersects the grasp center area proximate the center point. The system also includes a control system operable to transmit instructions to position the robotic hand within the wellbore and to variably position the robotic thumb and the robotic finger relative to each other and thereby open and close the robotic hand.

An aspect combinable with any of the other aspects can include the following features. The main body can be configured to attach to a wireline conveyance.

An aspect combinable with any of the other aspects can include the following features. The main body can be configured to attach to a downhole end of a coiled tubing string.

An aspect combinable with any of the other aspects can include the following features. The camera can include a plurality of lenses configured to provide an operator with binocular images.

DETAILED DESCRIPTION

Retrieval of fish from a wellbore can be difficult or complicated due to the variable type, size, location, position, or orientation of the fish within the wellbore. Although numerous types of fishing tools have been developed, it is frequently necessary to choose or configure such tools prior to insertion in the wellbore, when no or limited information may be available or known regarding type, size, location, position, or orientation of the fish in the wellbore. Retrieval of the fish can be hampered by improper choice or configuration of the tool based on such limited information. Even to the extent such tools can be configured or positioned downhole based on characteristics of the fish based on downhole images or other sources of information regarding the fish, retrieval can be difficult due to imprecise or inaccurate positioning, configuration, or alignment of tongs, grabbers, or other fishing components.

In some embodiments of the present disclosure, a system, method, or apparatus includes or comprises a fishing tool that includes a grabbing assembly. In some embodiments, the grabbing assembly comprises a robotic "hand" that can be articulated or positioned in the wellbore and that resembles a human hand in structure and function, thereby making operation of the grabbing assembly more intuitive to the operator. In some embodiments of the present disclosure, the grabber assembly includes a camera so configured that it can image a grasping point or grasping area of the 'fingers' of the robotic hand and transmit such images to an operator in real-time. Embodiments of the present disclosure can enable greater efficiency, precision, or accuracy in fishing operations.

Figure 1:
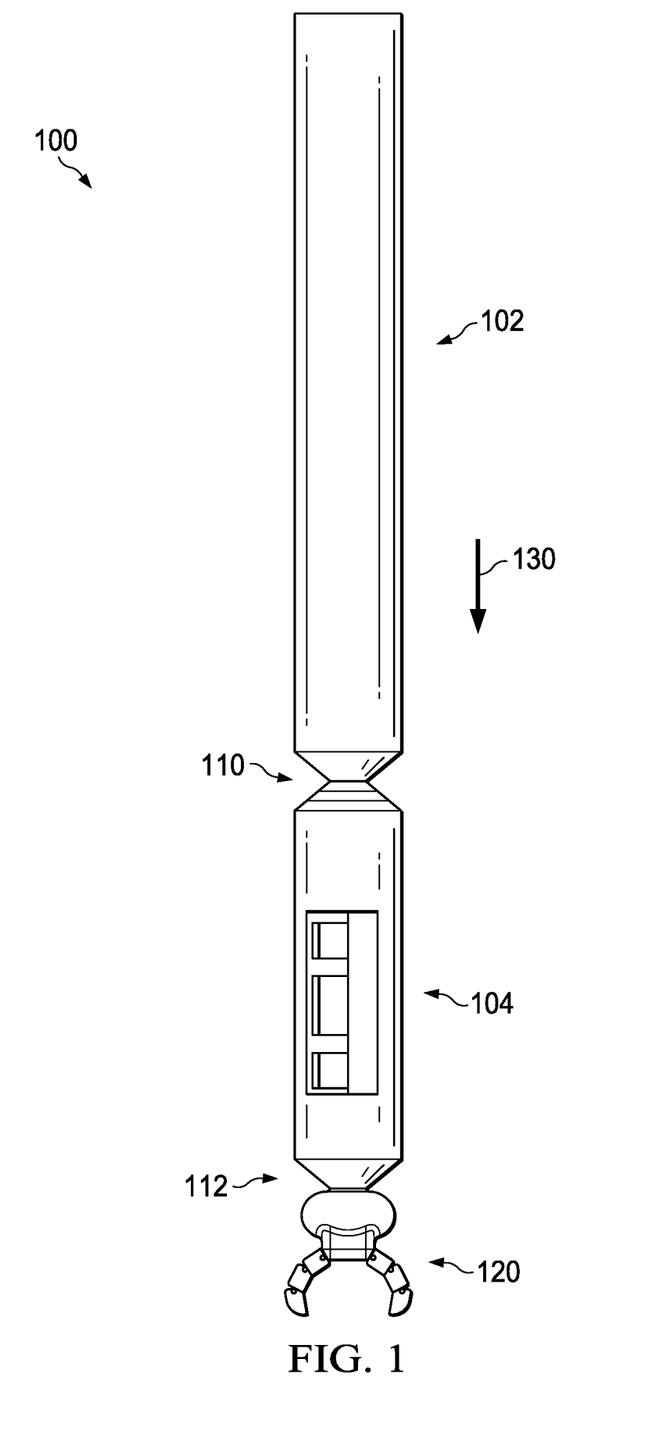
FIG. 1 is a schematic illustrations of a robotic fishing tool in accordance with an embodiment of the present disclosure.

FIG. 1 is a schematic illustrations of a downhole robotic fishing tool in accordance with an embodiment of the present disclosure. Referring to FIG. 1, downhole robotic fishing tool 100 includes a main body 102, an intermediate body 104, and a grabber assembly comprising a robotic hand 120. As shown in greater detail in FIG. 3, main body 102 and the other components of tool 100 are sized and otherwise configured to be positioned in a wellbore. In some embodiments, tool 100 is oriented such that robotic hand 120 is at a downhole end of (i.e., is in a downhole direction 130 from the other components of) tool 100. In some embodiments, intermediate body 104 is connected to main body 102 by a first articulating joint 110 which allows intermediate body 104 to pivot or rotate relative to main body 102. Robotic hand 120 is likewise connected to intermediate body 104 by a second articulating joint 112 which allows for robotic hand 120 to pivot or rotate relative to intermediate body 104. Robotic hand 120 can open or close or otherwise be configured (for example, to grab, hold, or release a fish or other object) and is described in greater detail in FIG. 2. In some embodiments, tool 100 is can be configured to be positioned and oriented in a wellbore such that first articulating joint 110 is an upper articulating joint attached to a downhole end of main body 102 and second articulating joint 112 is a lower articulating joint attached to a downhole end of intermediate body 104. Intermediate body 104 can in some embodiments be referred to as a "kick-over section" as it can enable robotic hand 120 to be kicked-over; that is, positioned radially relative to the centerline of a borehole.

Tool 100 can in some embodiments be lowered into (and positioned at different locations within) a wellbore via a wireline, coiled tubing, or other suitable conveyance. In other embodiments, tool 100 can be an autonomous tool that is a component of an autonomous device (such as a downhole tractor or crawler) with no wire, tubing, or other physical connection to the surface. In some embodiments, joints 110 and 112 can be omnidirectional joints. In some embodiments, joints 110 and 112 can be orthogonal, rotational, twisting, or other suitable joints or combinations of such joints. In some embodiments, joints 110 and 112 can be operated via motors, solenoids, cables, actuators, or other means, such that intermediate body 104 and robotic hand 120 can be rotated, pivoted, or otherwise positioned relative to main body 102 and relative to each other in response to commands from an operator via a wired or wireless connection from a control unit at a surface or subsurface location. In some embodiments, power for to such motors, solenoids, cables, or other actuators can be provided via a wire or cable from the surface location. In some embodiments, such power can also or instead be from one or more batteries on or within tool 100. In some embodiments, tool 100 can include additional or other joints and additional other bodies, body segments, or components.

In some embodiments, tool 100 can include various sensors to measure pressure, temperature, axial forces including tension or compression, or other parameters acting on (or within in the environment proximate) to tool 100. In some embodiments, such sensors can include tension or compression sensors to measure, for example, the weight or pulling force as tool 100 is raised or lowered within a wellbore, such that an operator can determine whether tool 100 has effectively grasped a fish and is pulling the fish in an uphole direction (or, conversely, whether a fish has not been grasped in spite of attempts or has slipped from the grasp of tool 100).

Figure 2:
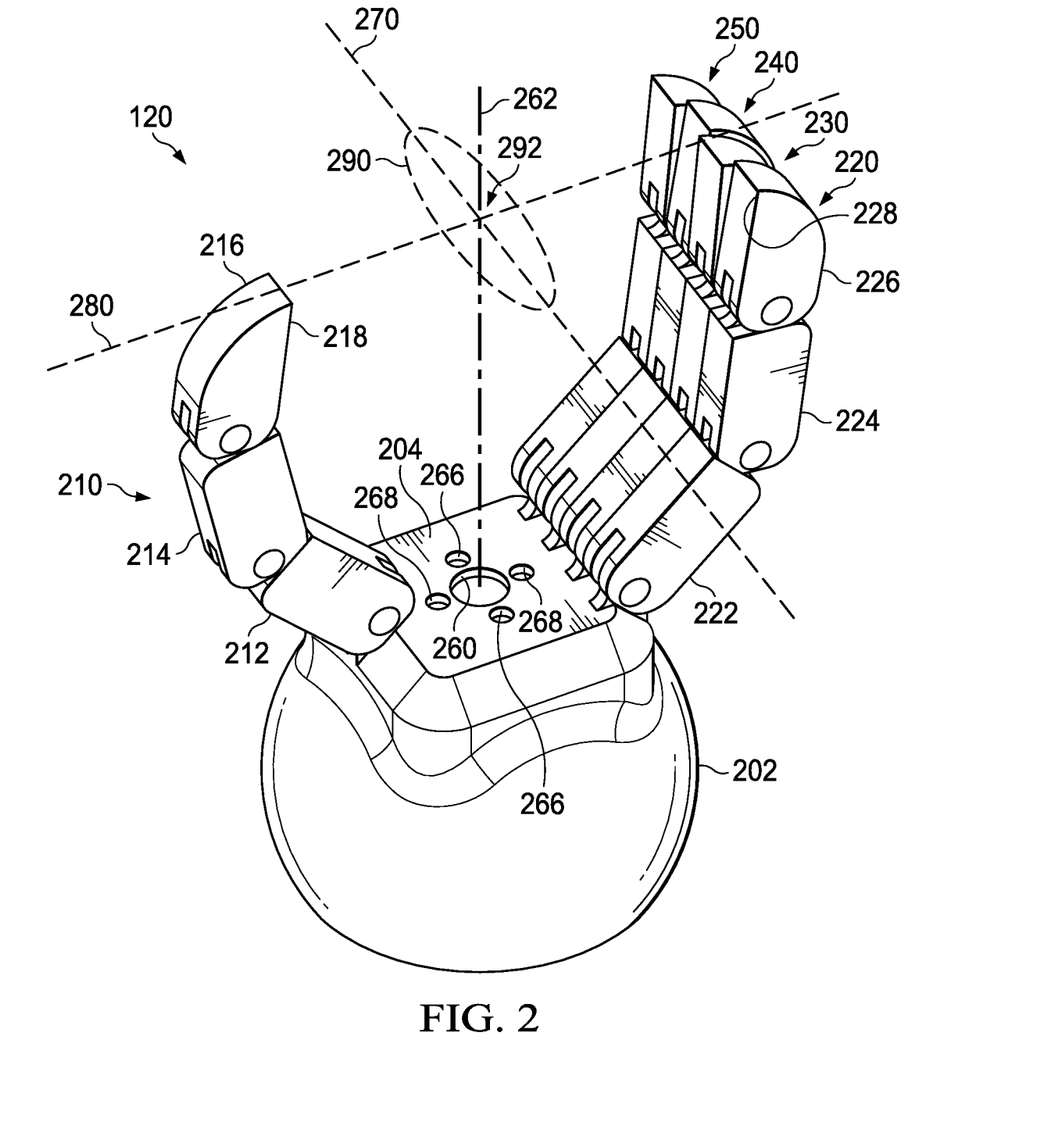
FIG. 2 is a schematic illustration of a grasping assembly of a robotic fishing tool in accordance with an embodiment of the present disclosure.

FIG. 2 is a schematic illustration of a robotic hand 120 of robotic fishing tool 100 of FIG. 1 in accordance with an embodiment of the present disclosure. Referring to FIG. 2, robotic hand 120 includes a hand body 202 having a palm 204. A robotic thumb 210 and a robotic finger 220 are attached by joints at their respective proximal ends to palm 204 in opposition such that, when robotic hand 120 is in the closed configuration, a distal end 218 of robotic thumb 210 and a distal end 228 of robotic finger 220 are within a grasp center area 290 centered on and proximate to a center point 292 defined by an intersection of a grasping axis 270 of robotic hand 120 and an opposition axis 280 of robotic hand 120. In some embodiments, robotic thumb 210 and robotic finger 220 are positioned in opposition to each other but otherwise have the same or substantially the same size and shape and have the same or substantially the same components. In other embodiments, robotic thumb 210 has a different size or shape or has different components from robotic finger 220.

In the illustrated embodiment, robotic finger 220 is a first robotic finger of a plurality of robotic fingers (220, 230, 240 and 250) attached at their respective proximal ends to palm 204 and individually rotatable in opposition to robotic thumb 210 substantially in parallel with first robotic finger 220. In some embodiments, one or more of robotic thumb 210 and robotic fingers 220, 230, 240, and 250 include multiple joint segments. In the illustrated embodiment, the multiple joint segments of thumb 210 include proximal phalange 212, intermediate phalange 214, and distal phalange 216, and the multiple joint segments of first finger 220 include proximal phalange 222, intermediate phalange 224, and distal phalange 226, and the remaining fingers 230, 240, and 250 likewise include respective proximal, intermediate, and distal phalanges. In the illustrated embodiment, the individual phalanges of thumb 210 and fingers 220, 230, 240, and 250 are connected by rotational joints, and thumb 210 and fingers 220, 230, 240, and 250 are connected to palm 204 by rotational joints; in other embodiments, one or more of these joints can be omnidirectional, orthogonal, twisting, or other suitable joints or combinations of such joints.

In some embodiments, each of the multiple joint segments of thumb 210 and fingers 220, 230, 240, and 250 can be independently articulated via motors, solenoids, cables, actuators, or other means, such that robotic hand 120 can be opened and closed and otherwise positioned or configured in response to commands from an operator via a wired or wireless connection from a control unit at a surface or subsurface location. Like joints 110 and 112, power for such motors, solenoids, cables, or other actuators can, in some embodiments, be provided via a wire or cable from the surface location or from one or more batteries on or within tool 100. Like a human hand, such configurations can include a plurality of intermediate configurations between a fully open configuration and a fully closed configuration, including various grasping, pinching, and releasing motions and positions using one, some, or all of the robotic thumb and robotic fingers in opposition or in parallel, with the gripping force variable as may be necessary to perform downhole tasks.

In some embodiments, robotic hand 120 can include one or more cameras to image the area where the above-described grasping or pinching occurs or other areas on or proximate to tool 100. In the illustrated embodiment, camera 260 is positioned on palm 204, and is positioned and configure such that the optical axis 262 of the camera 260 intersects the grasp center area proximate the center point. In the illustrate embodiment, the optical axis 262 of camera 260 is substantially perpendicular to the grasping axis 270 of robotic hand 120. In the illustrated embodiment, such configuration and positioning of camera 260 relative to robotic thumb 210 and robotic fingers 220, 230, 240, and 250 and the other components of tool 100 enables an operator to readily, efficiently, and effectively locate a fish or other object using the images from the camera, determine its type, location, position, size, or other characteristic or characteristics, and position the robotic hand and fingers such that the object can be grasped or otherwise manipulated. In some embodiments, such feedback from the camera can be in real-time to the operator, and the similarity between the robotic hand 120 and the human hand enables the operator to more intuitively operate the robotic hand, thumb, fingers, and other components of tool 100 in response to the real-time images.

In some embodiments, camera 260 can include a single lens and imaging module (such as a digital imaging module). In other embodiments, camera 260 can include two or more lenses and/or imaging modules. In some embodiments, camera 260 includes two lenses spaced apart so as to provide the operator and/or a control module with binocular images and depth perception (or other depth or spatial information) due to parallax, thus providing the operator with additional information regarding the position and position of object to be grasped relative to the hand and the fingers (and/or of other downhole objects or conditions).

In some embodiments, camera 260 can be protected by a cap or cover that can be opened or removed in response to a command from the operator. In this way, the lens and other components of the camera can be protected, for example, when running the tool up or down the wellbore, but operable to receive images when the tool has reached the desired downhole location.

In the illustrated embodiment, robotic hand 120 further includes a light source or light sources 266 and configured to illuminate the grasp center area. In the illustrated embodiment, light sources 266 are positioned on palm 204 and are directed towards center grasp area 290. In some embodiments, light source 266 can be turned on or off in response to commands from the operator. Light source 266 can enable or enhance imaging by camera 260.

In the illustrated embodiment, robotic hand 120 further includes a fluid nozzle or nozzles 268 and configured to flow a substantially optically clear (or substantially clear) fluid to or towards the grasp center area 290. In the illustrated embodiment, fluid nozzles 268 are positioned on palm 204. Fluid nozzles 268 can be fed by a fluid reservoir and pump (not shown) within robotic hand 120 or by a fluid conduit from the surface. Because wellbore fluids (such as drilling fluid or produced fluids) may be opaque or otherwise act to prevent imaging of grasping area 290, such optically clear fluid can enable or enhance imaging of an object and the surroundings by camera 260.

In some embodiments, robotic thumb 210 and robotic fingers 220, 230, 240, and 250 can include a rough or textured coating or finish with a high coefficient of friction, to enhance the gripping function and decrease the chances of a fish or other object slipping from the robotic hand once it has been gripped. Such coating or finish can in some embodiments cover most or all of the robotic hand, or in some embodiments cover only the inside surfaces of the phalanges (in other words, the surfaces that would be in contact with the fish or other object during operations). In some embodiments, the robotic thumb 210, robotic fingers 220, 230, 240, and 250, or palm 204 can include force or touch sensors to provide feedback to the operator during gripping or grasping operations.

Figure 3A:
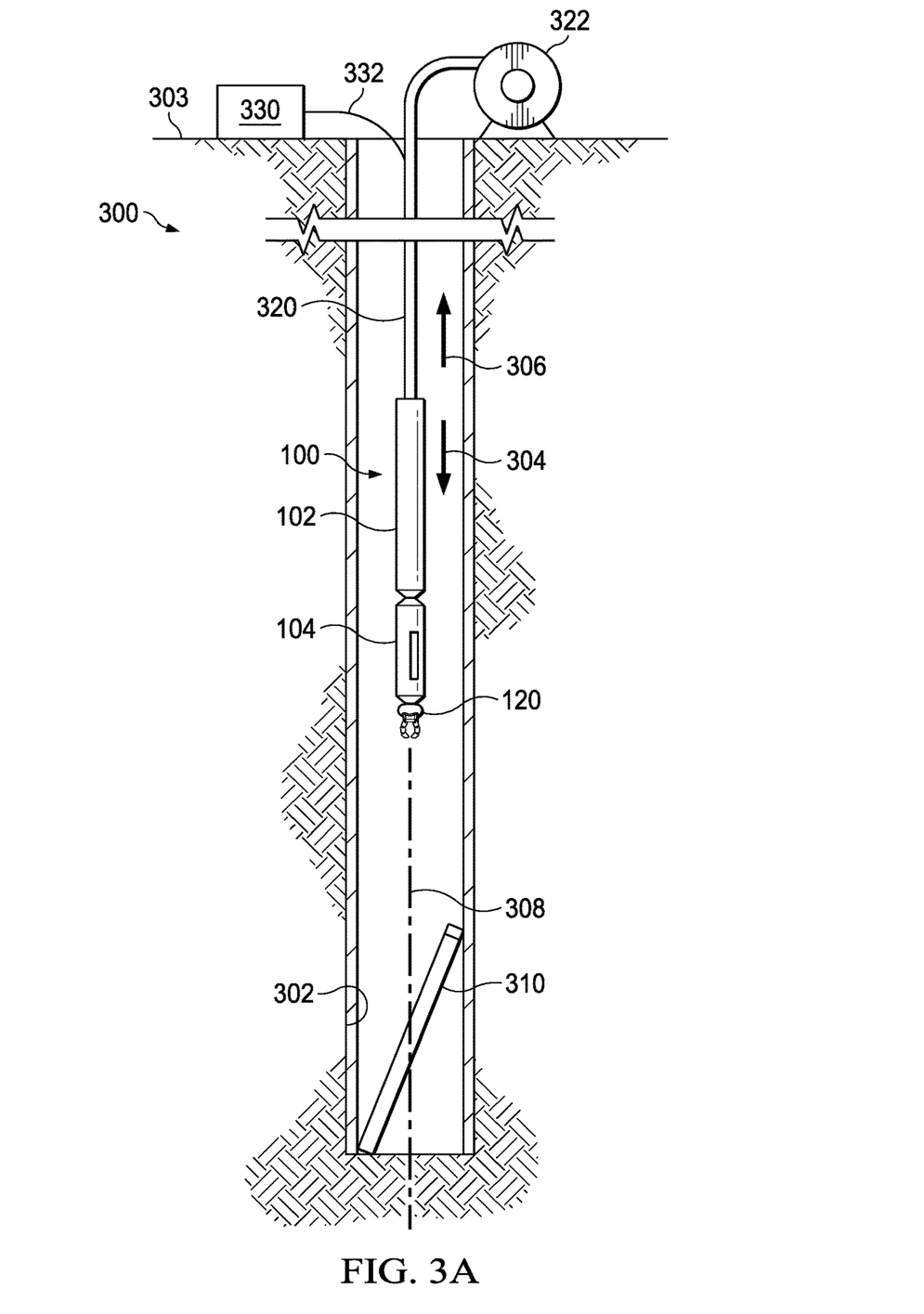
FIGS. 3A-3G are schematic illustrations of operation of a robotic fishing tool system in a wellbore in accordance with an embodiment of the present disclosure.

FIGS. 3A-3G are schematic illustrations of a robotic fishing tool system using robotic fishing tool 100 of FIGS. 1 and 2 in accordance with an embodiment of the present disclosure. Referring to FIG. 3A, in the illustrated embodiment system 300 is a system for retrieving a fish 310 within a borehole 302 drilled from a surface 303. System 300 includes a robotic fishing tool 100 as described in reference to FIG. 1, including a main body 102, intermediate body 104, and robotic hand 120. In other embodiments, the system can include other or additional suitable tools having suitable grabber assemblies and imaging functions. As shown in FIG. 3A, robotic fishing tool 100 is lowered into borehole 302 that has been drilled from surface 303. In the illustrated embodiment, fish 310 is at an angle (such as an oblique angle) relative to the centerline axis 308 of borehole 302. Fish 310 can be (or can be a component or fragment of) a pipe, tool, wire, or other type of object.

As shown in FIG. 3A, robotic fishing tool 100 is lowered into borehole 302 by a conveyance such as a coiled tubing or wireline conveyance, or an autonomous conveyance such as a downhole tractor. In the illustrated embodiment, the conveyance is coiled tubing 320 supplied from a tubing spool 322. Coiled tubing 320 can lower robotic fishing tool 100 in downhole direction 304 or in uphole direction 306. Borehole 302 is illustrated as a vertical well but can be a horizontal, lateral, or other well or well portion or well segment.

System 300 can further include a control module 330 which is configured to receive signals from and transmit signals to robotic fishing tool 100 via wired connection 332. In the same or in other embodiments, control module 330 can receive signals from and transmit signals to robotic fishing tool 100 via a wireless connection instead of or in addition to a wired connection. In some embodiments, control module 330 is positioned at a surface location. In some embodiments, some or all of the components of control module 330 can be partially or fully positioned in a downhole location.

Control module 330 can in some embodiments receive data from tool 100, process the data and provide the operator with visual or other information (for example, via a video screen). In some embodiments, control module 330 can process such data via artificial intelligence (AI) algorithms which can provide the operator with optimum parameters for the operations (for example, light, rate, angles and fishing technique). The operator can transmit control signals to tool 100 via control module 330.

Figure 3B:
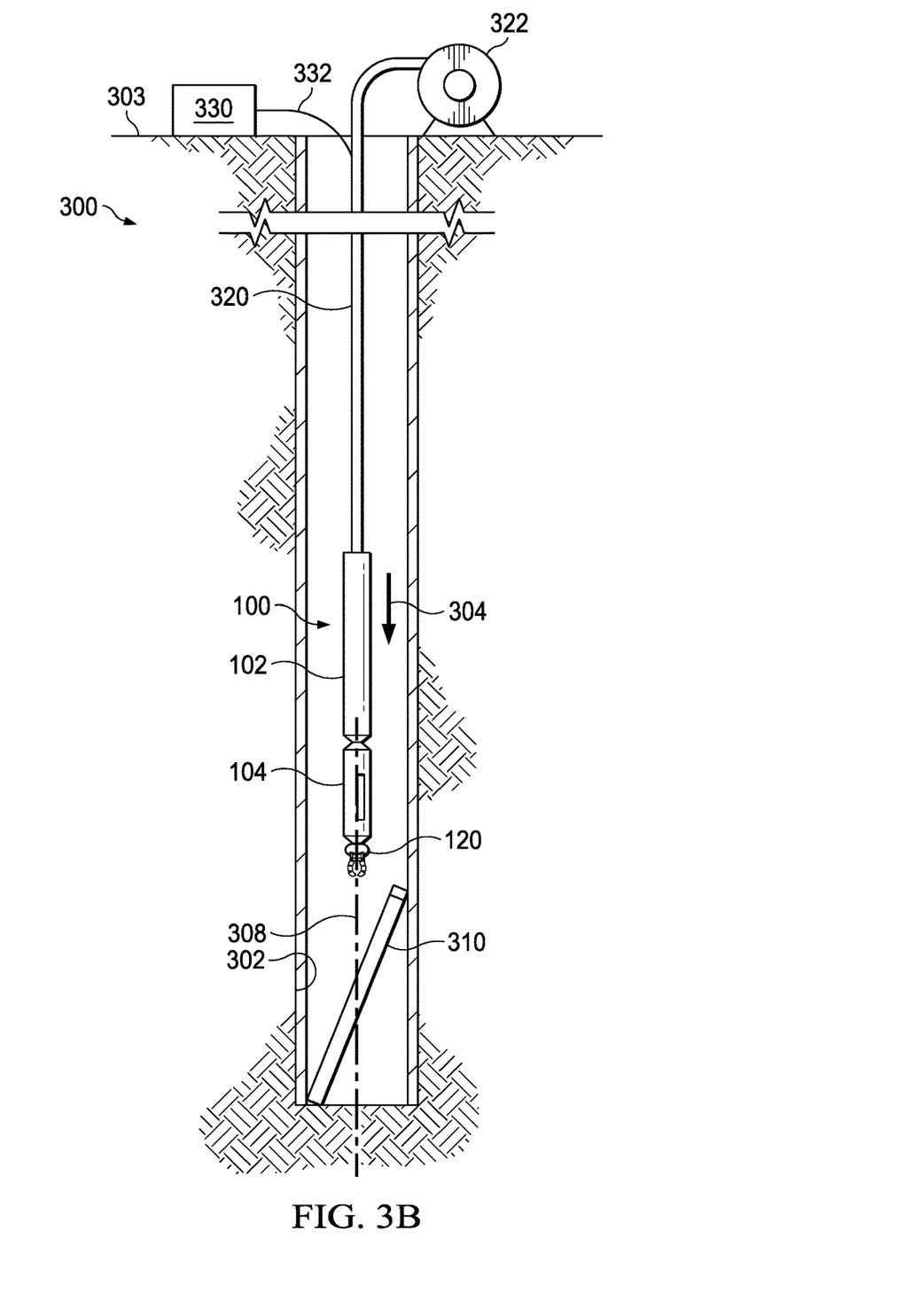
Figure 3C:
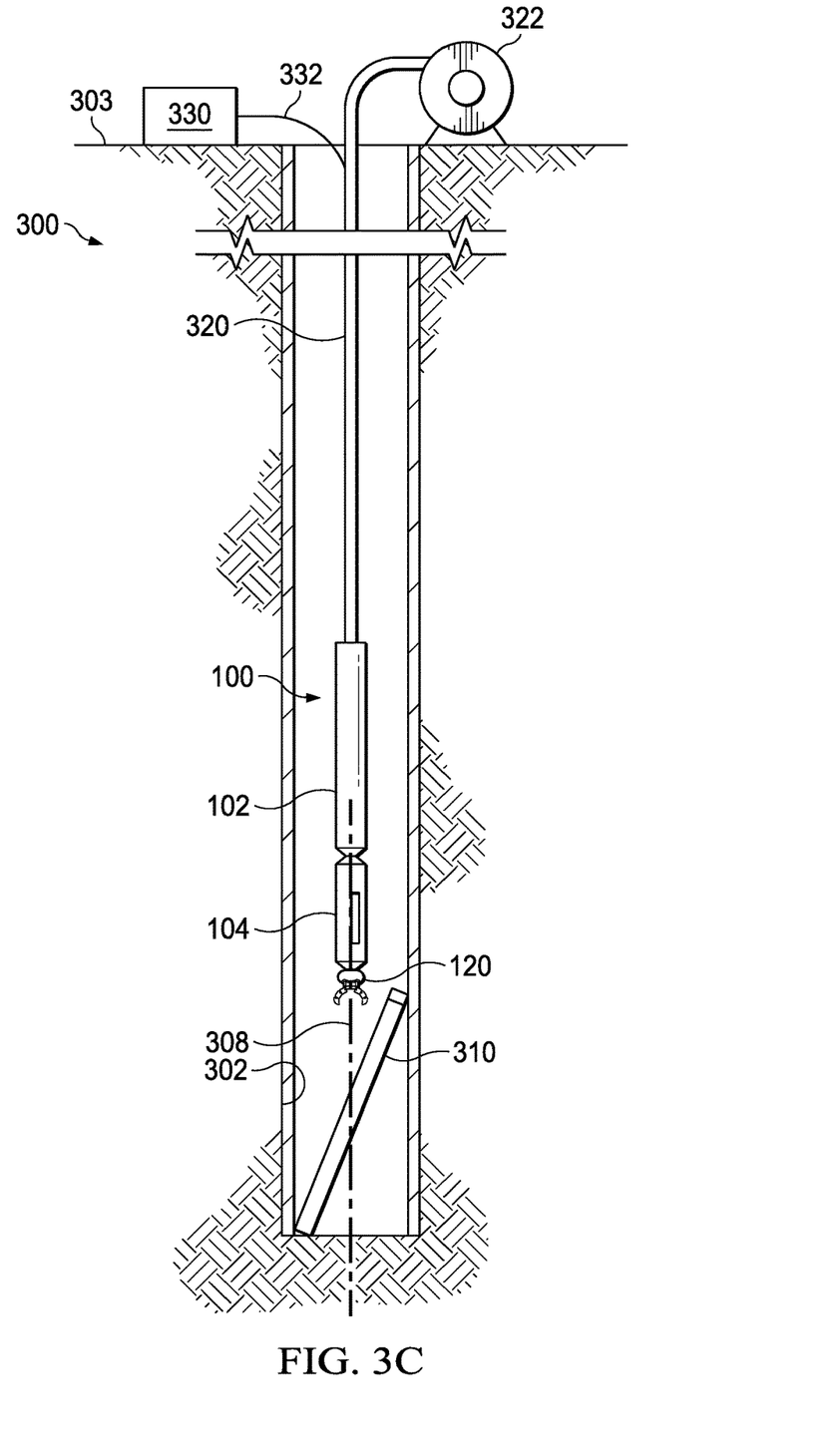

As shown in FIG. 3B, robotic fishing tool 100 can be lowered to (or proximate to) the location where fish 310 is located or expected or suspected to be located. As shown in FIG. 3C, robotic hand 120 can be opened, thereby enabling imaging of fish 310 by the camera located in the palm, as described in reference to FIG. 2. At the same time (or at another suitable time), a lens cover or cap can be removed from the camera, and/or an optically clear fluid can be flowed from nozzles in the palm, as described in reference to FIG. 2. Based on an image from the camera, an operator can determine one or more characteristics of fish 310 such as its type, location, position, orientation, or size.

Figure 3D:
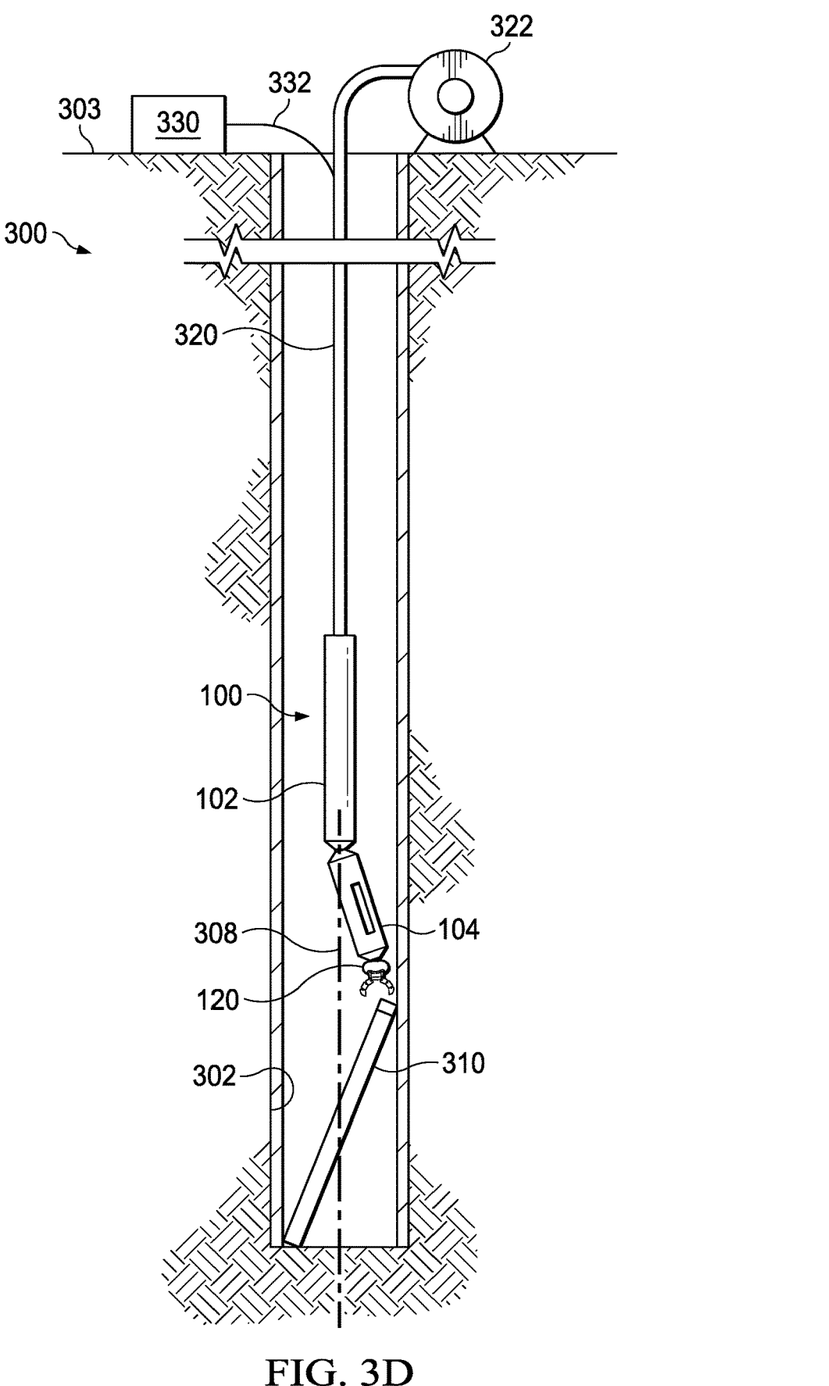
Figure 3E:
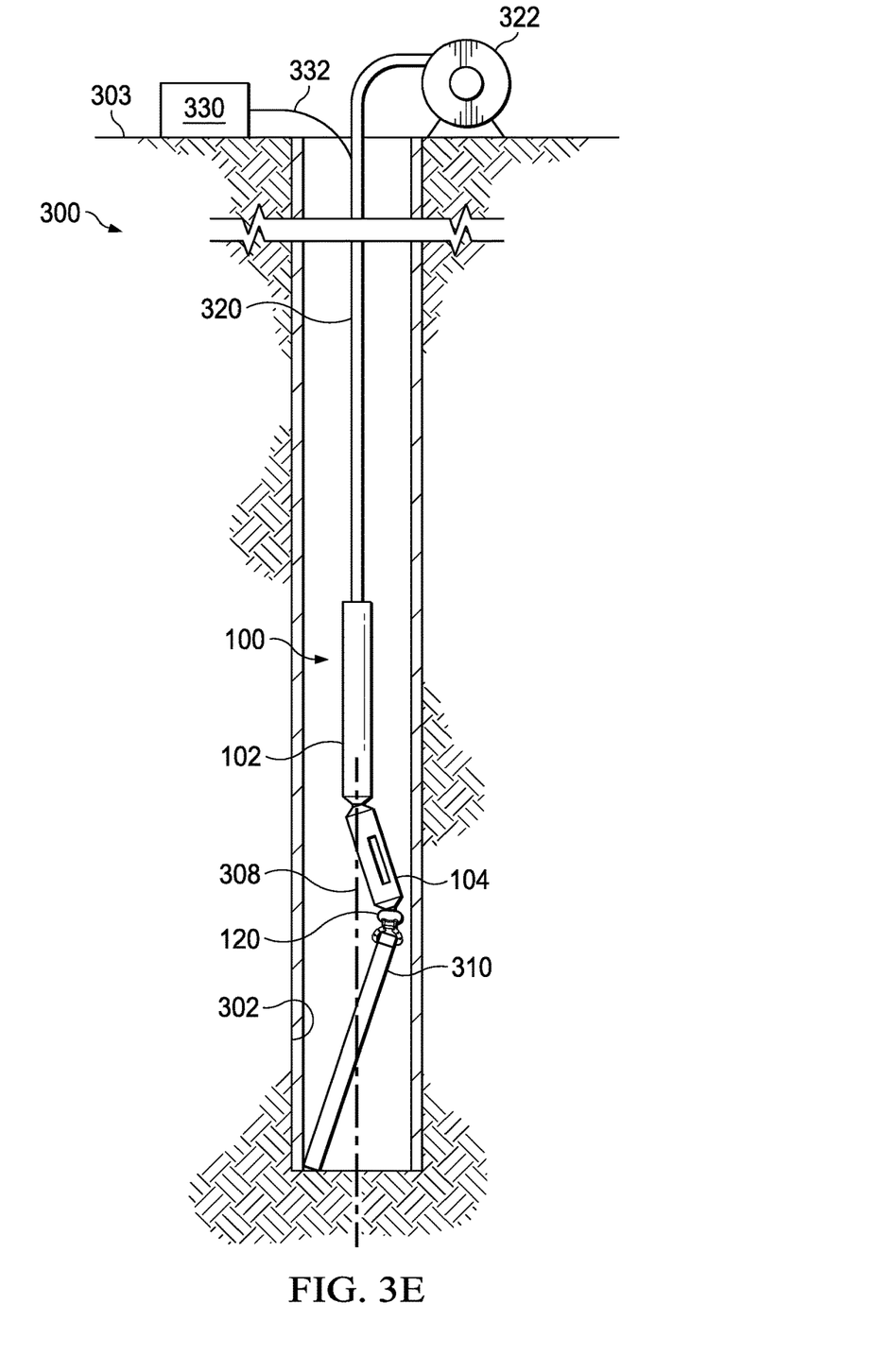

As shown in FIG. 3D, intermediate body 104 can be moved or "kicked-over" radially relative to wellbore centerline 308, such that the robotic thumb and robotic finger or fingers of robotic hand 120 are aligned with (or otherwise suitably positioned relative to) a top portion of fish 310. Based on images from the camera located on the palm of the robotic hand and the determined type, location, position, orientation, and/or size of fish 310 and of the robotic thumb and robotic fingers of robot hand 112 based on those images, the operator can determine and transmit commands to initiate a suitable grabbing and holding configuration and sequence. As shown in FIG. 3E, the operator can then initiate the determined grabbing and holding configuration and sequence, thus grabbing and grasping fish 310.

Figure 3F:
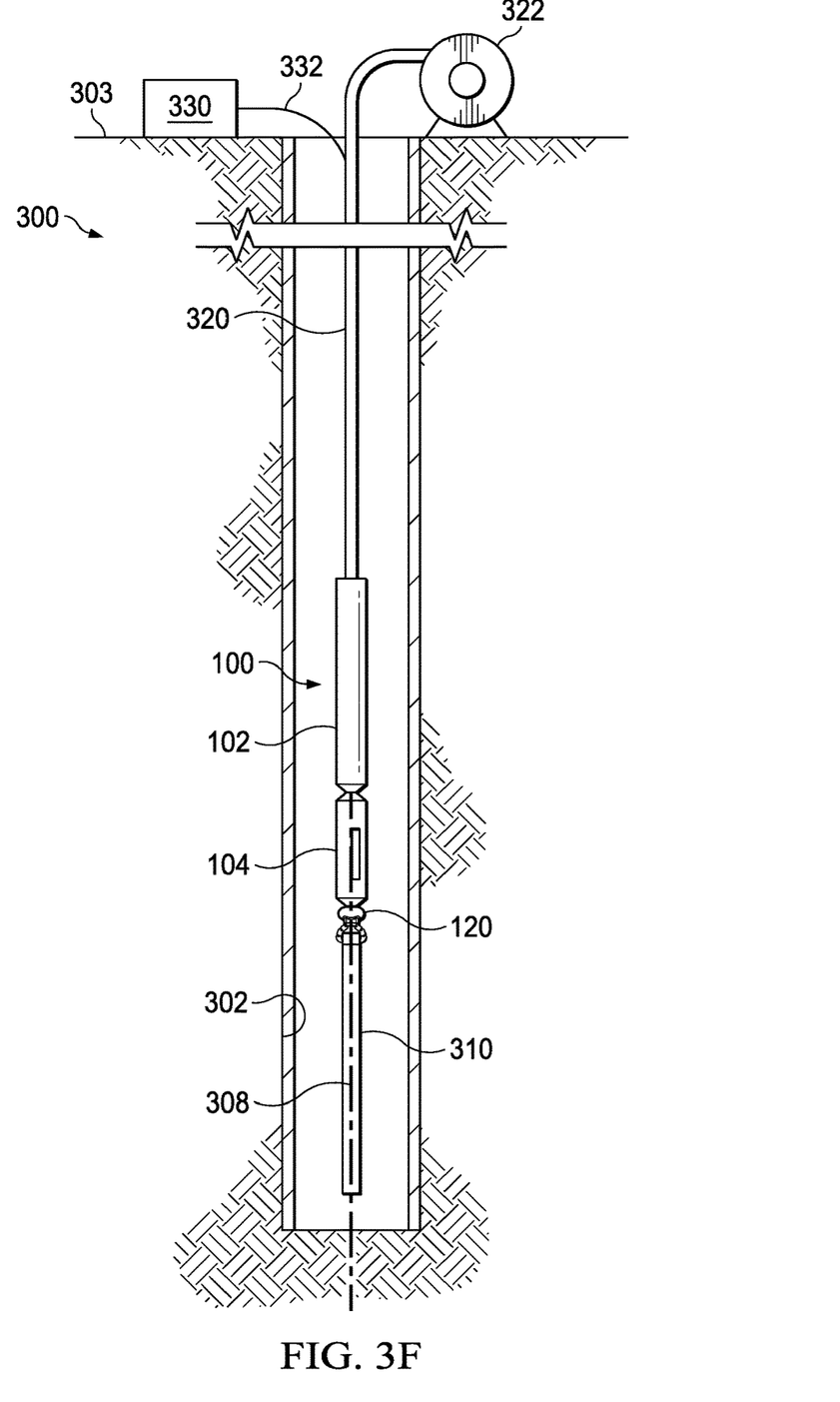
Figure 3G:
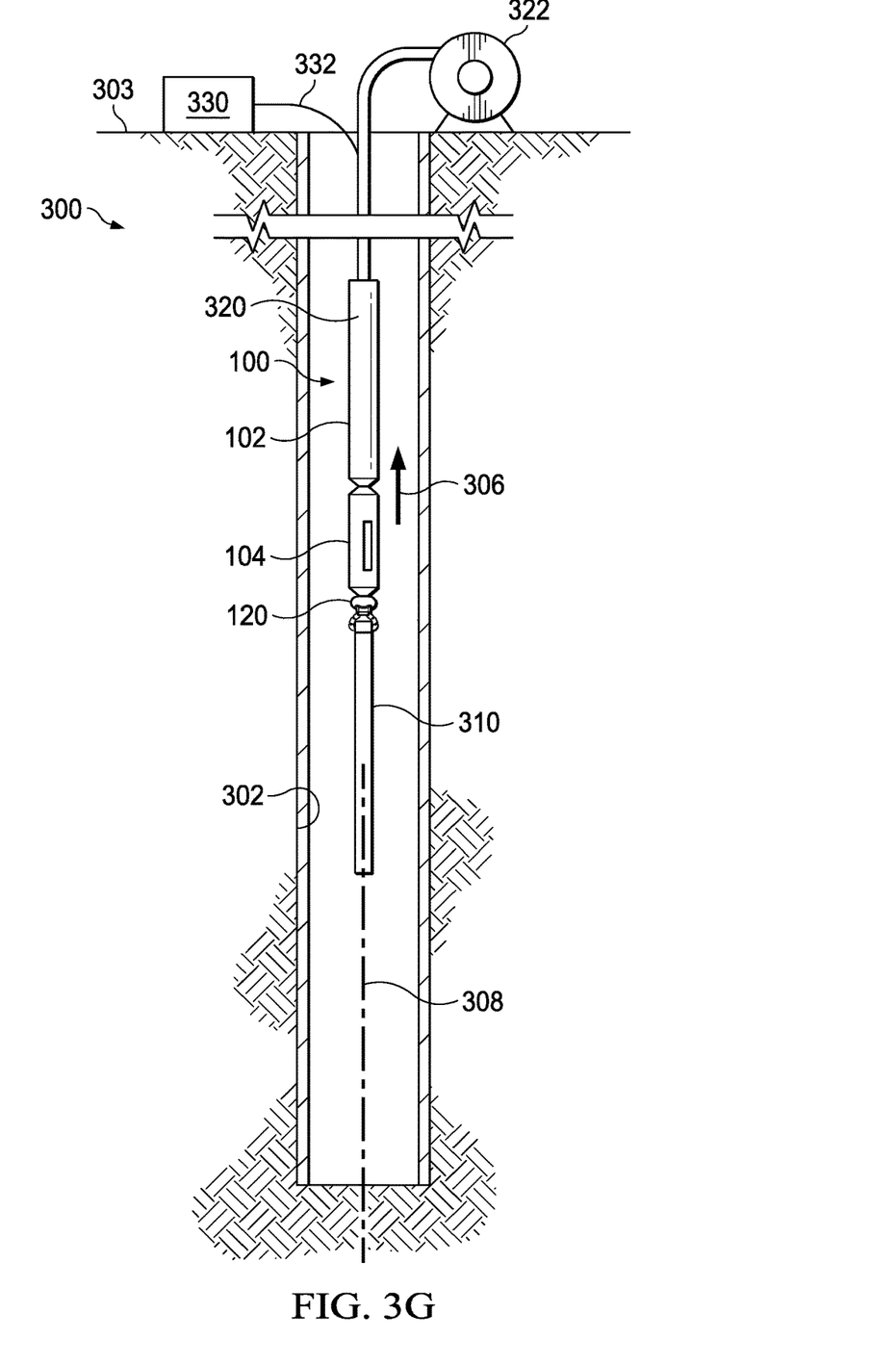

As shown in FIG. 3F, the operator can transmit intermediate portion 104 can be returned to its initial position aligned with centerline 308 and lifting and retrieval of fish 310 can begin. As shown in FIG. 3G, such lifting can continue, and in some embodiments the operator can confirm continued grasp and lifting of fish 310 based on feedback from axial force and touch sensors on robotic fishing tool 100.

Figure 4:
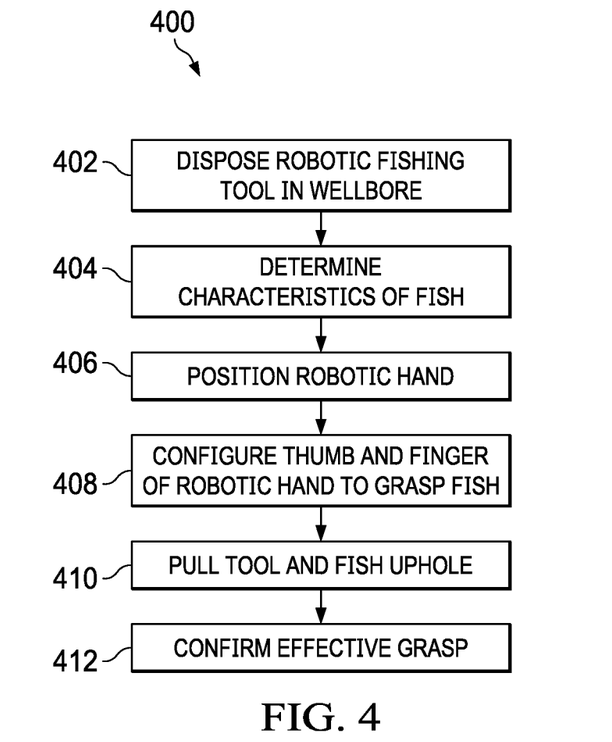
FIG. 4 process flow diagram of a method of operating a robotic fishing tool system in accordance with an embodiment of the present disclosure.

FIG. 4 process flow diagram of a method of fishing an object from within a wellbore, in accordance with an embodiment of the present disclosure. Referring to FIG. 4, method 400 begins at step 402 in which a robotic fishing tool is disposed in a wellbore by an operator via a suitable conveyance. In some embodiments, the robotic fishing tool be or can be similar to the tool described in reference to FIGS. 1 and 2, and can include a main body, an intermediate body connected to a downhole end of the main body by an upper articulating joint, and a robotic hand connected to a downhole end of the intermediate body by a lower articulating joint as described in reference to FIG. 1. In some embodiments, the robotic hand can include a robotic thumb and a robotic finger in opposition as described in reference to FIG. 2, and can include a camera configured such that it can image a grasp center area of the robotic hand, again as described in reference to FIG. 2. The robotic fishing tool can be lowered to a position at or near a fish or other downhole object to be retrieved or fished.

At step 404, the operator can, based on an image from the camera, determine one or more characteristics of the fish, including but not limited to its type, size, location, position, or orientation. At step 406, based on the determined characteristic or characteristics of the object, the operator can position the robotic hand at or near the object (for example, at a relative position radially from a centerline of the borehole). At step 408, the robotic thumb and robotic finger of the robotic hand can be configured to grasp the object.

At step 410, the operator can lift the fish by lifting the robotic tool in an uphole direction. At step 412, the operator can confirm that the object has been effectively grasped (and not dropped or slipped out of the grasp) and pulled uphole based on signals received from tension or compression sensors or other sensors on the robotic fishing tool, that the object has been grasped and is being pulled in an uphole direction by the tool.

While this specification contains many specific implementation details, these should not be construed as limitations on the scope of any claims or of what may be claimed, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described should not be understood as requiring such separation in all implementations, and it should be understood that the described program components and systems can generally be integrated together in a single software product or packaged into multiple software products.

A number of implementations have been described. Nevertheless, it will be understood that various modifications may be made without departing from the spirit and scope of the disclosure. For example, example operations, methods, or processes described herein may include more steps or fewer steps than those described. Further, the steps in such example operations, methods, or processes may be performed in different successions than that described or illustrated in the figures. Accordingly, other implementations are within the scope of the following claims.

What is claimed is:

1. A downhole robotic fishing tool, comprising:
   a main body configured to be positioned in a wellbore;
   an intermediate body connected to a downhole end of the main body by an upper articulating joint;
   a robotic hand connected to a downhole end of the intermediate body by a lower articulating joint, the robotic hand configurable between an open configuration and a closed configuration and comprising:
   a palm;
   a robotic thumb and a robotic finger attached at their respective proximal ends to the palm in opposition such that, when the robotic hand is in the closed configuration, a distal end of the robotic thumb and a distal end of robotic finger are within a grasp center area centered on a center point defined by an intersection of a grasping axis and an opposition axis of the robotic hand;
   a camera positioned on the palm, the camera having an optical axis that intersects the grasp center area proximate the center point; and
   a fluid nozzle positioned on the palm and configured to flow a substantially optically clear fluid to the grasp center area.

2. The downhole robotic fishing tool of claim 1, wherein the robotic hand is configurable between a plurality of intermediate configurations between the open configuration and the closed configuration.

3. The downhole robotic fishing tool of claim 1, wherein the robotic finger is a first robotic finger of a plurality of robotic fingers attached at their respective proximal ends to the palm and individually rotatable in opposition to the robotic thumb substantially in parallel with the first robotic finger.

4. The downhole robotic fishing tool of claim 1, wherein the robotic thumb and the robotic finger each comprise a plurality of joint segments.

5. The downhole robotic fishing tool of claim 4, wherein at least some of the plurality of joint segments each comprise a respective proximal phalange, a respective intermediate phalange, and a respective distal phalange.

6. The downhole robotic fishing tool of claim 1, wherein the main body is configured to attach to a downhole end of a coiled tubing string.

7. The downhole robotic fishing tool of claim 1, wherein the main body is configured to attach to a wireline conveyance.

8. The downhole robotic fishing tool of claim 1, further comprising sensors configured to measure tension or compression forces acting on at least a portion of the tool.

9. The downhole robotic fishing tool of claim 1, further comprising a light source positioned on the palm and configured to illuminate the grasp center area.

10. The downhole robotic fishing tool of claim 1, wherein the optical axis of the camera is substantially perpendicular to the grasping axis of the hand.

11. The downhole robotic fishing tool of claim 1, wherein the camera comprises a plurality of lenses configured to provide an operator with binocular images.

12. A method of fishing an object from within a wellbore, the method comprising:
    disposing a robotic fishing tool in the wellbore, the robotic fishing tool comprising:
      a main body;
      an intermediate body connected to a downhole end of the main body by an upper articulating joint;
      a robotic hand connected to a downhole end of the intermediate body by a lower articulating joint, the robotic hand configurable between an open configuration and a closed configuration and comprising:
        a palm;
        a robotic thumb and a robotic finger attached at their respective proximal ends to the palm in opposition such that, when the robotic hand is in the closed configuration, a distal end of the robotic thumb and a distal end of robotic finger are within a grasp center area centered on a center point defined by an intersection of a grasping axis and an opposition axis of the robotic hand; and
        a camera positioned on the palm, the camera having an optical axis that intersects the grasp center area proximate the center point;
    flowing, by a fluid nozzle positioned on the palm, a substantially optically clear fluid to the grasp center area;
    determining, based on an image from the camera, a characteristic of the object, the characteristic of the object comprising at least one of its type, location, position, orientation, or size; and
    based on the determined the characteristic of the object:
      positioning the robotic hand in the wellbore such that the object is in or near the grasp center area; and
      configuring the robotic thumb and robotic finger to grasp the object.

13. The method of claim 12, further comprising:
    after configuring the robotic thumb and robotic finger to grasp the object, pulling the tool in an uphole direction; and confirming, based on a measurement by a tension or compression sensor on the tool, that the object has been grasped and is being pulled in an uphole direction by the tool.

14. The method of claim 12, further comprising illuminating, by a light source positioned on the palm, the grasp center area.

15. The method of claim 12, wherein the camera comprises a plurality of lenses configured to provide an operator with binocular images.

16. A system for fishing an object from a wellbore, the system comprising:
a fishing tool configured to be positioned in the wellbore, the tool comprising:
a main body;
an intermediate body connected to a downhole end of the main body by an upper articulating joint;
a robotic hand connected to a downhole end of the intermediate body by a lower articulating joint, the robotic hand configurable between an open configuration and a closed configuration and comprising:
a palm;
a robotic thumb and a robotic finger attached at their respective proximal ends to the palm in opposition such that, when the robotic hand is in the closed configuration, a distal end of the robotic thumb and a distal end of robotic finger are within a grasp center area centered on a center point defined by an intersection of a grasping axis and an opposition axis of the robotic hand; and
a camera positioned on the palm, the camera having an optical axis that intersects the grasp center area proximate the center point, wherein the camera comprises a plurality of lenses configured to provide an operator with binocular images; and
a control system operable to transmit instructions to position the robotic hand within the wellbore and to variably position the robotic thumb and the robotic finger relative to each other and thereby opening and closing the robotic hand.

17. The system of claim 16, wherein the main body is configured to attach to a downhole end of a coiled tubing string.

18. The system of claim 16, wherein the main body is configured to attach to a wireline conveyance.

19. A downhole robotic fishing tool, comprising:
a main body configured to be positioned in a wellbore;
an intermediate body connected to a downhole end of the main body by an upper articulating joint;
a robotic hand connected to a downhole end of the intermediate body by a lower articulating joint, the robotic hand configurable between an open configuration and a closed configuration and comprising:
a palm;
a robotic thumb and a robotic finger attached at their respective proximal ends to the palm in opposition such that, when the robotic hand is in the closed configuration, a distal end of the robotic thumb and a distal end of robotic finger are within a grasp center area centered on a center point defined by an intersection of a grasping axis and an opposition axis of the robotic hand; and
a camera positioned on the palm, the camera having an optical axis that intersects the grasp center area proximate the center point, the wherein the camera comprises a plurality of lenses configured to provide an operator with binocular images.

20. A method of fishing an object from within a wellbore, the method comprising:
disposing a robotic fishing tool in the wellbore, the robotic fishing tool comprising:
a main body;
an intermediate body connected to a downhole end of the main body by an upper articulating joint;
a robotic hand connected to a downhole end of the intermediate body by a lower articulating joint, the robotic hand configurable between an open configuration and a closed configuration and comprising:
a palm;
a robotic thumb and a robotic finger attached at their respective proximal ends to the palm in opposition such that, when the robotic hand is in the closed configuration, a distal end of the robotic thumb and a distal end of robotic finger are within a grasp center area centered on a center point defined by an intersection of a grasping axis and an opposition axis of the robotic hand; and
a camera positioned on the palm, the camera having an optical axis that intersects the grasp center area proximate the center point and comprising a plurality of lenses configured to provide an operator with binocular images;
determining, based on the binocular images from the camera, a characteristic of the object, the characteristic of the object comprising at least one of its type, location, position, orientation, or size; and
based on the determined the characteristic of the object:
positioning the robotic hand in the wellbore such that the object is in or near the grasp center area; and
configuring the robotic thumb and robotic finger to grasp the object.

21. A system for fishing an object from a wellbore, the system comprising:
a fishing tool configured to be positioned in the wellbore, the tool comprising:
a main body;
an intermediate body connected to a downhole end of the main body by an upper articulating joint;
a robotic hand connected to a downhole end of the intermediate body by a lower articulating joint, the robotic hand configurable between an open configuration and a closed configuration and comprising:
a palm;
a robotic thumb and a robotic finger attached at their respective proximal ends to the palm in opposition such that, when the robotic hand is in the closed configuration, a distal end of the robotic thumb and a distal end of robotic finger are within a grasp center area centered on a center point defined by an intersection of a grasping axis and an opposition axis of the robotic hand; and
a camera positioned on the palm, the camera having an optical axis that intersects the grasp center area proximate the center point; and
a fluid nozzle positioned on the palm and configured to flow a substantially optically clear fluid to the grasp center area; and
a control system operable to transmit instructions to position the robotic hand within the wellbore and to variably position the robotic thumb and the robotic finger relative to each other and thereby opening and closing the robotic hand.

* * * * *